United States Patent
Kim et al.

(10) Patent No.: US 12,441,162 B2
(45) Date of Patent: Oct. 14, 2025

(54) HEAT PUMP SYSTEM FOR VEHICLE

(71) Applicants: HYUNDAI MOTOR COMPANY, Seoul (KR); KIA CORPORATION, Seoul (KR)

(72) Inventors: Jeawan Kim, Hwaseong-si (KR); Jae Yeon Kim, Hwaseong-si (KR); Man Hee Park, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 156 days.

(21) Appl. No.: 18/373,515

(22) Filed: Sep. 27, 2023

(65) Prior Publication Data
US 2024/0399824 A1    Dec. 5, 2024

(30) Foreign Application Priority Data
Jun. 5, 2023  (KR) .................. 10-2023-0072403

(51) Int. Cl.
*B60H 1/00* (2006.01)

(52) U.S. Cl.
CPC ............................... *B60H 1/00899* (2013.01)

(58) Field of Classification Search
CPC ............ B60H 1/00899; B60H 1/00921; B60H 2001/00307; B60H 1/3204; B60H 1/00321; B60H 1/00385; B60H 1/00485; B60H 1/3227; B60H 1/32284; B60H 1/323; B60H 1/00914; B60H 1/143; F25B 41/31; F25B 43/043; F25B 2400/054; F25B 2600/2513
See application file for complete search history.

(56) References Cited

U.S. PATENT DOCUMENTS

| | | | |
|---|---|---|---|
| 11,254,190 B2 | 2/2022 | He et al. | |
| 2005/0120733 A1* | 6/2005 | Healy | F25B 1/10 |
| | | | 62/324.4 |
| 2007/0039347 A1* | 2/2007 | Robertson Abel | F25B 41/39 |
| | | | 62/324.1 |
| 2022/0088990 A1* | 3/2022 | Kim | B60H 1/3223 |
| 2022/0088991 A1* | 3/2022 | Kim | B60H 1/03 |
| 2022/0088995 A1* | 3/2022 | Kim | B60H 1/00278 |
| 2022/0089000 A1* | 3/2022 | Kim | B60H 1/143 |
| 2022/0185067 A1* | 6/2022 | Kim | B60H 1/00278 |
| 2023/0073993 A1* | 3/2023 | Kim | F25B 41/24 |
| 2023/0194136 A1* | 6/2023 | Kim | F25B 43/006 |
| | | | 62/324.4 |
| 2023/0271477 A1* | 8/2023 | Kim | B60H 1/00485 |
| | | | 62/504 |
| 2024/0208298 A1* | 6/2024 | Kim | B60H 1/2225 |
| 2024/0369274 A1* | 11/2024 | English | F25B 41/22 |

* cited by examiner

*Primary Examiner* — Kun Kai Ma
(74) *Attorney, Agent, or Firm* — MCDONNELL BOEHNEN HULBERT & BERGHOFF LLP

(57) ABSTRACT

In order to improve cooling and heating performance by applying a gas injection device selectively operating in an air conditioning mode of vehicle interior to increase the flow rate of the refrigerant, a heat pump system for a vehicle may include a compressor, a HVAC module, a heat-exchanger, a first expansion valve, a gas injection device, a first refrigerant connection line, and a chiller.

17 Claims, 6 Drawing Sheets

HEAT PUMP SYSTEM FOR VEHICLE

CROSS REFERENCE TO RELATED APPLICATIONS

This application claims priority to and the benefit of Korean Patent Application No. 10-2023-0072403 filed in the Korean Intellectual Property Office on Jun. 5, 2023, the entire contents of which is incorporated herein by reference.

BACKGROUND

(a) Field

The present disclosure relates to a heat pump system for a vehicle. More particularly, the present disclosure relates to a heat pump system for a vehicle capable of improving cooling and heating performance by applying a gas injection device selectively operating in an air conditioning mode of vehicle interior.

(b) Description of the Related Art

Generally, an air conditioning system for a vehicle includes an air conditioner unit circulating a refrigerant in order to heat or cool an interior of the vehicle.

The air conditioner unit, which maintains the interior of the vehicle at an appropriate temperature regardless of a change in an external temperature to maintain a comfortable interior environment, is configured to heat or cool the interior of the vehicle by heat-exchange by a condenser and an evaporator in a process in which a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Meanwhile, recently, in accordance with a continuous increase in interest in energy efficiency and an environmental pollution problem, the development of an environmentally-friendly vehicle capable of substantially substituting for an internal combustion engine vehicle is required, and the environmentally-friendly vehicle is classified into an electric vehicle driven using a fuel cell or electricity as a power source and a hybrid vehicle driven using an engine and a battery.

In the electric vehicle or the hybrid vehicle among these environmentally-friendly vehicles, a separate heater is not used unlike an air conditioner of a general vehicle, and an air conditioner used in the environmentally-friendly vehicle is generally called a heat pump system.

Meanwhile, the electric vehicle driven by a power source of a fuel cell generates driving force by converting chemical reaction energy between oxygen and hydrogen into electrical energy. In this process, heat energy is generated by a chemical reaction in a fuel cell. Therefore, it is necessary in securing performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, cooling means, a heat pump system, and a battery cooling system, respectively, should be configured as separate closed circuits so as to prevent heat generation of the motor, an electric component, and the battery including a fuel cell.

Therefore, a size and a weight of a cooling module disposed at the front of the vehicle are increased, and a layout of connection pipes supplying a refrigerant and a coolant to each of the heat pump system, the cooling means, and the battery cooling system in an engine compartment becomes complicated.

In addition, since a battery cooling system for heating or cooling the battery according to a state of the vehicle is separately provided to obtain an optimal performance of the battery, a plurality of valves for selectively interconnecting connections pipes are employed, and thus noise and vibration due to frequent opening and closing operations of the valves may introduced into the vehicle interior, thereby deteriorating the ride comfort.

In addition, when heating the vehicle interior, the heating performance may be deteriorated due to the lack of heat source, the electricity consumption may be increased due to the usage of the electric heater, and the power consumption of the compressor may be increased.

The above information disclosed in this Background section is only for enhancement of understanding of the background of the disclosure, and therefore it may contain information that does not form the prior art that is already known in this country to a person of ordinary skill in the art.

SUMMARY

The present disclosure attempts to provide a heat pump system for a vehicle capable of improving cooling and heating performance by applying a gas injection device selectively operating in an air conditioning mode of vehicle interior to increase the flow rate of the refrigerant.

A heat pump system for a vehicle may include a compressor configured to compress a refrigerant, a HVAC module having an internal condenser and an evaporator connected to the compressor through a refrigerant line, further having an opening and closing door configured to adjust air that passes through the evaporator to flow into the internal condenser, according to a cooling mode or a heating mode of the vehicle, a heat-exchanger connected to the internal condenser through the refrigerant line, the heat-exchanger being configured to heat-exchange the refrigerant supplied from the internal condenser with air to condensate or evaporate the refrigerant, a first expansion valve positioned on the refrigerant line between the heat-exchanger and the evaporator, a gas injection device connected to the refrigerant line between the internal condenser and the heat-exchanger, the gas injection device configured to expand and flow the refrigerant supplied from the internal condenser or the heat-exchanger and to supply a portion the supplied refrigerant to the compressor to increase a flow rate of the refrigerant circulating the refrigerant line, a first refrigerant connection line having a first end connected to the refrigerant line between the compressor and the evaporator, and a second end connected to the refrigerant line between the heat-exchanger and the evaporator, and a chiller positioned on the first refrigerant connection line, the chiller being configured to adjust temperature of the coolant by heat-exchanging the refrigerant introduced through the first refrigerant connection line with a selectively introduced coolant.

The gas injection device may further include a gas-liquid separator configured to separate and discharge a gas refrigerant and a liquid refrigerant from an introduced refrigerant, a second expansion valve positioned on the refrigerant line between the internal condenser and the heat-exchanger, a first line having a first end connected to the second expansion valve and a second end connected to the gas-liquid separator, the first line being configured to supply the refrigerant supplied from the internal condenser to the gas-liquid separator according to an operation of the second expansion valve, a second line having a first end connected to the refrigerant line between the second expansion valve and the heat-exchanger, and a second end connected to the refrigerant line between the heat-exchanger and the evaporator, a third expansion valve positioned on the second line, a third line having a first end connected to the third expansion valve, and a second end connected to the gas-liquid separator, a fourth expansion valve positioned on the refrigerant line between the heat-exchanger and the first expansion valve, a fourth line having a first end connected to the fourth expansion valve, and a second end connected to the first line between the gas-liquid separator and the second expansion valve; and a supply line connecting the gas-liquid separator and the compressor, the supply line being configured to supply the gaseous refrigerant from the gas-liquid separator to the compressor.

The third expansion valve may be configured to expand the refrigerant supplied from the gas-liquid separator and supply the expanded refrigerant to the heat-exchanger, or supply the refrigerant supplied from the gas-liquid separator to the chiller or the evaporator, in an unexpanded state.

The second, the third, and the fourth expansion valves are operated in an air conditioning mode of the vehicle including the cooling mode, the heating mode, and a dehumidification mode, wherein the second, the third, and the fourth expansion valves are configured to selectively expand the refrigerant while controlling flowing of the refrigerant supplied to the gas injection device.

The gas-liquid separator may be operated when the second expansion valve or the fourth expansion valve expands the refrigerant and supplies the expanded refrigerant to the gas-liquid separator in an air conditioning mode of the vehicle, and the gas-liquid separator is configured to supply the gas refrigerant among the supplied refrigerant to the compressor through the supply line to increase the flow rate of the refrigerant circulating the refrigerant line.

A heat pump system may further include a fifth expansion valve positioned on the first refrigerant connection line, and a second refrigerant connection line having a first end connected to the fifth expansion valve, and a second end connected to the refrigerant line between the evaporator and the compressor.

When only an ambient air heat is to be recollected in the heating mode of the vehicle, the second refrigerant connection line may be opened by the fifth expansion valve.

When the gas-liquid separator is operated in a cooling mode of the vehicle and cooling of a battery module is required: the first line is closed by the second expansion valve, the second line connected to the refrigerant line at an upstream side of the heat-exchanger with reference to the third expansion valve is closed by the third expansion valve, the second line connected to the refrigerant line at a downstream side of the heat-exchanger with reference to the third expansion valve is opened by the third expansion valve, the third line is opened by the third expansion valve, the fourth line is opened by the fourth expansion valve, the supply line is opened, the first refrigerant connection line is opened by the fifth expansion valve, the second refrigerant connection line is closed by the fifth expansion valve, the first expansion valve expands the refrigerant introduced through the refrigerant line and supplies the expanded refrigerant to the evaporator, the second expansion valve supplies the refrigerant introduced through the refrigerant line to the heat-exchanger without expansion, the third expansion valve flows the refrigerant supplied from the gas-liquid separator to a part of the second line without expansion, the fourth expansion valve expands the refrigerant supplied from the heat-exchanger and supplies the expanded refrigerant to the gas-liquid separator, the fifth expansion valve expands the refrigerant introduced from the gas-liquid separator through the second line and a part of the refrigerant line, and supplies the expanded refrigerant to the chiller through the first refrigerant connection line, and the gas-liquid separator supplies the gaseous refrigerant, among the introduced refrigerant, to the compressor through the opened supply line.

When an operation of the gas-liquid separator is not required in a cooling mode of the vehicle, and cooling of a battery module is required, the first line may be closed by the second expansion valve, the second line and the third line may be closed by the third expansion valve, the fourth line may be closed by the fourth expansion valve, the first refrigerant connection line may be opened by the fifth expansion valve, the second refrigerant connection line may be closed by the fifth expansion valve, flowing of the refrigerant to the gas-liquid separator may be blocked, the supply line may be closed, the first expansion valve may expand the supplied refrigerant and supply the expanded refrigerant the evaporator through the refrigerant line, the second expansion valve and the fourth expansion valve may flow the supplied refrigerant without expansion, the third expansion valve may stop operating, the fifth expansion valve may expand the supplied refrigerant and supply the expanded refrigerant the chiller through the first refrigerant connection line.

When the gas-liquid separator is operated in the heating mode of the vehicle, and waste heat of an ambient air heat and an electrical component is to be recollected, the first expansion valve may stop operating, the first line may be opened by the second expansion valve, the second line connected to the refrigerant line at an upstream side of the heat-exchanger with reference to the third expansion valve may be opened by the third expansion valve, the second line connected to the refrigerant line at a downstream side of the heat-exchanger with reference to the third expansion valve may be closed by the operation of the third expansion valve, the third line may be opened by the third expansion valve, the fourth line may be closed by the fourth expansion valve, the supply line may be opened, the first refrigerant connection line may be opened by the fifth expansion valve, the second refrigerant connection line may be closed by the fifth expansion valve, the second expansion valve may expand the refrigerant introduced through the refrigerant line and supply the expanded refrigerant to the gas-liquid separator, the third expansion valve may expand the refrigerant supplied from the gas-liquid separator and supply the expanded refrigerant to the heat-exchanger, the fourth expansion valve may flow the refrigerant supplied from the heat-exchanger to the refrigerant line without expansion, the fifth expansion valve may supply the refrigerant introduced from the fourth expansion valve through the refrigerant line to the chiller without expansion, and the gas-liquid separator may supply the gaseous refrigerant, among the introduced refrigerant, to the compressor through the opened supply line.

When the gas-liquid separator is operated in the heating mode of the vehicle, and an ambient air heat is to be recollected, the first expansion valve may stop operating, the first line may be opened by the second expansion valve, the second line connected to the refrigerant line at an upstream side of the heat-exchanger with reference to the third expansion valve may be opened by the third expansion valve, the second line connected to the refrigerant line at a downstream side of the heat-exchanger with reference to the third expansion valve may be closed by the third expansion valve, the third line may be opened by the third expansion valve, the fourth line may be closed by the fourth expansion valve, the supply line may be opened, a part of the first refrigerant connection line connected to the fifth expansion valve at an upstream side of the chiller may be opened by the fifth expansion valve, remaining part of the first refrigerant connection line connected to the refrigerant line at a downstream side of the chiller may be closed by the fifth expansion valve, the second refrigerant connection line may be opened by the fifth expansion valve, the second expansion valve may expand the refrigerant introduced through the refrigerant line and supply the expanded refrigerant to the gas-liquid separator, the third expansion valve may expand the refrigerant supplied from the gas-liquid separator and supply the expanded refrigerant to the heat-exchanger, the fourth expansion valve may flow the refrigerant supplied from the heat-exchanger to the refrigerant line without expansion, the fifth expansion valve may supply the refrigerant introduced from the fourth expansion valve through the refrigerant line to the compressor through the second refrigerant connection line without expansion, and the gas-liquid separator may supply the gaseous refrigerant, among the introduced refrigerant, to the compressor through the opened supply line.

When an operation of the gas-liquid separator is not required in the heating mode of the vehicle, and waste heat of an ambient air heat and an electrical component is to be recollected, the first expansion valve may stop operating, the first line may be closed by the second expansion valve, the second line and the third line may be closed by the third expansion valve, the fourth line may be closed by the fourth expansion valve, the first refrigerant connection line may be opened by the fifth expansion valve, the second refrigerant connection line may be closed by the fifth expansion valve, flowing of the refrigerant to the gas-liquid separator may be blocked, the supply line may be closed, the second expansion valve may expand the refrigerant supplied from the internal condenser and supply the expanded refrigerant to the heat-exchanger, the third expansion valve may stop operating, the fourth expansion valve may flow the supplied refrigerant to the refrigerant line without expansion, and the fifth expansion valve may supply the supplied refrigerant to the chiller through the first refrigerant connection line without expansion.

The second expansion valve, the third expansion valve, the fourth expansion valve, and the fifth expansion valve may be 3-way electronic expansion valves each having one inlet and two outlets and configured to selectively expand the refrigerant while controlling flowing of the refrigerant.

The fifth expansion valve may be configured to flow the refrigerant introduced through the first refrigerant connection line in an expanded state in a cooling mode of the vehicle, and flow the refrigerant introduced through the first refrigerant connection line in an unexpanded state, in the heating mode of the vehicle.

A heat pump system may further include a cooling apparatus including an electrical component and a battery module through which the coolant circulates, where the chiller connected to the electrical component through a first coolant line through which the coolant circulates, and connected to the battery module through a second coolant line through which the coolant circulates.

When waste heat of the electrical component is to be recollected in the heating mode of the vehicle, the first coolant line may be opened to connect the chiller and the electrical component.

When the battery module is to be cooled in a cooling mode of the vehicle, or when waste heat of the battery module is to be recollected in the heating mode of the vehicle, the second coolant line may be opened to connect the chiller and the battery module.

A heat pump system may further include an accumulator provided on the refrigerant line between the evaporator and the compressor.

As described above, according to a heat pump system for a vehicle according to an embodiment, cooling and heating performance may be improved by applying a gas injection device selectively operating in an air conditioning mode of vehicle interior to increase the flow rate of the refrigerant.

In addition, according to the present disclosure, performance of the system may be maximized by using the gas injection device while minimizing the number of required components, and thus streamlining and simplification of the system may be achieved.

In addition, according to an embodiment, it is possible to reduce manufacturing cost and weight through simplification of an entire system, and to improve space utilization.

DETAILED DESCRIPTION

Figure 1:
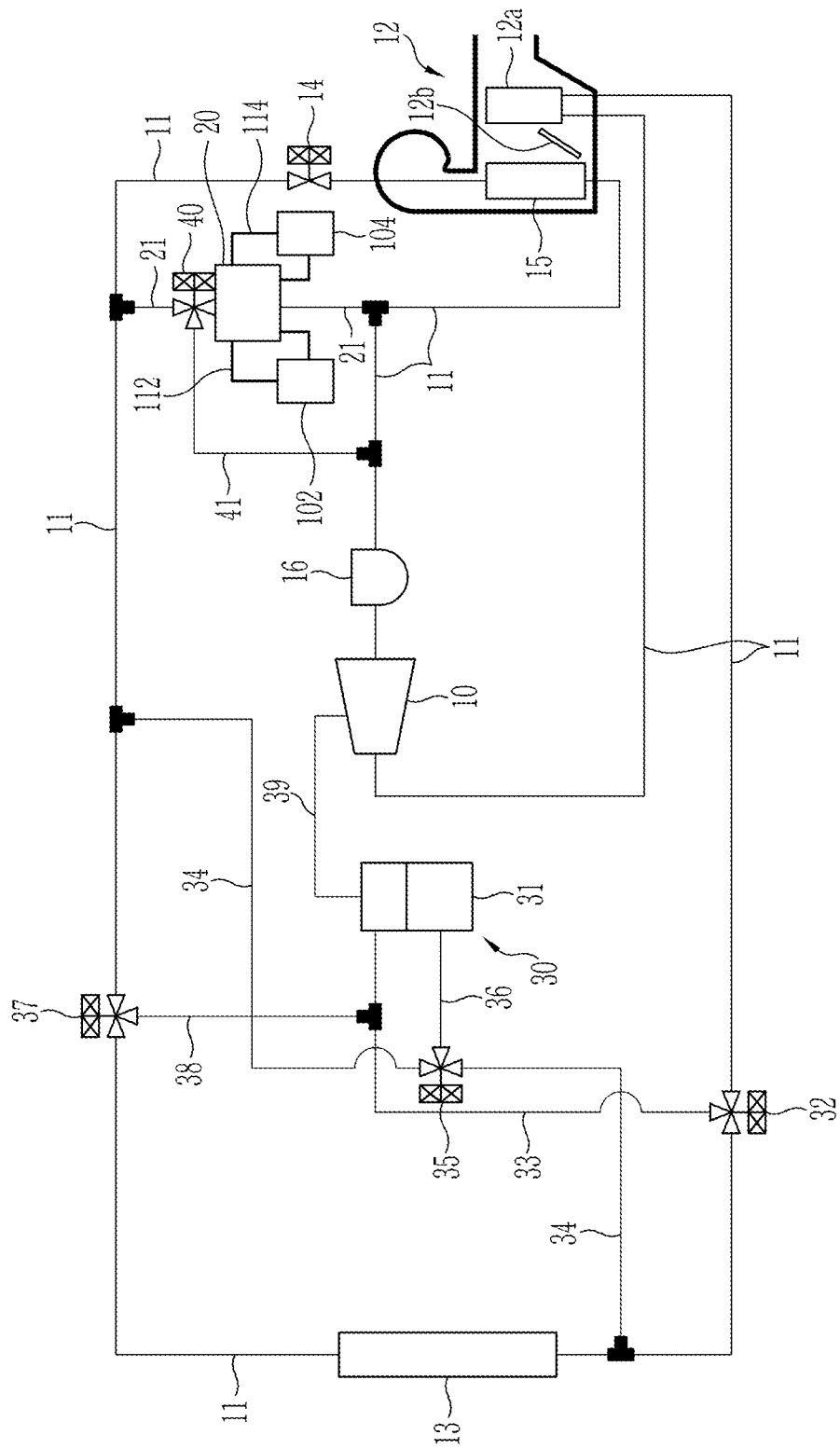
FIG. 1 is a block diagram of a heat pump system of a vehicle according to an embodiment.

An exemplary embodiment of the present disclosure will hereinafter be described in detail with reference to the accompanying drawings.

Exemplary embodiments disclosed in the present specification and the constructions depicted in the drawings are only the preferred embodiments of the present disclosure, and do not cover the entire scope of the present disclosure. Therefore, it will be understood that there may be various equivalents and variations at the time of the application of this specification.

In order to clarify the present disclosure, parts that are not related to the description will be omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc., are exaggerated for clarity.

In addition, unless explicitly described to the contrary, the word "comprise" and variations such as "comprises" or "comprising", will be understood to imply the inclusion of stated elements but not the exclusion of any other elements.

Furthermore, each of terms, such as " . . . unit", " . . . means", " . . . portions", " . . . part", and " . . . member" described in the specification, mean a unit of a comprehensive element that performs at least one function or operation.

FIG. 1 is a block diagram of a heat pump system of a vehicle according to an embodiment.

A heat pump system for a vehicle according to an embodiment may improve cooling and heating performance in a cooling mode or a heating mode, by employing a gas injection device 30 selectively operating in an air conditioning mode of vehicle interior.

Here, in the heat pump system of an electric vehicle, a cooling apparatus circulating a coolant may be interconnected with an air conditioner unit that is an air-conditioner apparatus for cooling and heating the vehicle interior.

That is, referring to FIG. 1, the heat pump system may include the air conditioner unit provided with the cooling apparatus, a compressor 10, HVAC module (Heating, Ventilation, and Air Conditioning) 12, a heat-exchanger 13, a first expansion valve 14, an evaporator 15, a chiller 20, a first refrigerant connection line 21, the gas injection device 30, and a second refrigerant connection line 41.

First, the cooling apparatus may include an electrical component 102 and a battery module 104 through which the coolant circulates.

The cooling apparatus may further include a radiator (not shown). The radiator is disposed at the front of the vehicle. A cooling fan (not shown) is provided at the rear of the radiator. Accordingly, the radiator may cool the coolant through an operation of the cooling fan and heat-exchange with the ambient air.

Here, the electrical component 102 may be connected to the chiller 20 through a first coolant line 112 flowing the coolant, and the battery module 104 may be connected to the chiller 20 through a second coolant line 114 flowing the coolant.

Here, when a waste heat of the electrical component 102 is to be recollected in the heating mode of the vehicle, the first coolant line 112 may be opened to connect the chiller 20 and the electrical component 102.

In addition, when the battery module 104 is to be cooled in the cooling mode of the vehicle, the second coolant line 114 may be or when a waste heat of the battery module 104 is to be recollected in the heating mode of the vehicle, opened to connect the chiller 20 and the battery module 104.

Here, the coolant may be selectively circulated through the first coolant line 112 and the second coolant line 114 by an operation of a water pump (not shown).

Meanwhile, the electrical component 102 may include an electric power control unit (EPCU), or a motor, or an inverter, or an on-board charger (OBC), or an autonomous driving controller, or the like.

The electric power control apparatus, or the inverter, or the motor, or the autonomous driving controller may generate heat while the vehicle is being driven, and the charger may generate heat when charging the battery module 104.

That is, when the waste heat of the electrical component 102 is to be recollected in the heating mode of the vehicle, heat generated from the electric power control apparatus, the motor, the inverter, or the charger, or the autonomous driving controller may be recollected.

In the present embodiment, the compressor 10 may compress the supplied refrigerant.

A HVAC module 12 may have an internal condenser 12a and the evaporator 15 connected to the compressor 10 through a refrigerant line 11.

The HVAC module 12 may be positioned an opening and closing door 12b configured to adjust air having passed through the evaporator 15 to selectively flow into the internal condenser 12a, according to the cooling mode of the vehicle or the heating mode.

That is, the opening and closing door 12b is opened in the heating mode of the vehicle such that the ambient air having passed through the evaporator 15 may flow to the internal condenser 12a.

To the contrary, in the cooling mode of the vehicle, the opening and closing door 12b closes a side to the internal condenser 12a such that the ambient air cooled while passing through the evaporator 15 may flow directly into the vehicle interior.

In the present embodiment, the heat-exchanger 13 may be connected to the internal condenser 12a through the refrigerant line 11. The heat-exchanger 13 may heat-exchange the refrigerant supplied from the internal condenser 12a with air to condensate or evaporate the refrigerant. That is, the heat-exchanger 13 may be an air-cooled heat-exchanger.

The first expansion valve 14 may be provided on the refrigerant line 11 between the heat-exchanger 13 and the evaporator 15.

In addition, the evaporator 15 is connected to the heat-exchanger 13 through the refrigerant line 11. When the refrigerant expanded by the first expansion valve 14 is introduced, the evaporator 15 may heat-exchange it with air introduced into the HVAC module 12 to evaporate the refrigerant.

Meanwhile, the air conditioner unit may further include an accumulator 16. The accumulator 16 may be provided on the refrigerant line 11 between the evaporator 15 and the compressor 10. The accumulator 16 only supplies a gaseous refrigerant to the compressor 10, thereby enhancing efficiency and durability of the compressor 10.

In the present embodiment, first end of the first refrigerant connection line 21 may be connected to the refrigerant line 11 between the compressor 10 and the evaporator 15. A second end of the first refrigerant connection line 21 may be connected to the refrigerant line 11 between the heat-exchanger 13 and the first expansion valve 14.

The chiller 20 is provided on the first refrigerant connection line 21. The coolant may selectively circulate through the chiller 20 through either or both of the first coolant line 112 and the second coolant line 114. That is, the chiller 20 may be a water-cooled heat-exchanger through which the coolant flows.

Accordingly, the chiller 20 may adjust temperature of the coolant by heat-exchanging the refrigerant introduced through the first refrigerant connection line 21 with selectively introduced coolant from either or both of the first coolant line 112 and the second coolant line 114.

In addition, the gas injection device 30 may be connected to the refrigerant line 11 between the internal condenser 12a and the first expansion valve 14. The gas injection device 30 may selectively expand and flow the refrigerant supplied from the condenser 12, and selectively supply a portion of the supplied refrigerant to the compressor 10 to increase the flow rate of the refrigerant circulating through the refrigerant line 11.

The gas injection device 30 may be selectively operated in the cooling mode, or the heating mode, or a dehumidification mode of the vehicle. Here, the gas injection device 30 may include a gas-liquid separator 31, a second expansion valve 32, a first line 33, a second line 34, a third expansion valve 35, a third line 36, a fourth expansion valve 37, a fourth line 38, and a supply line 39.

First, the gas-liquid separator 31 may separate and selectively discharge a gaseous refrigerant and a liquid refrigerant from an introduced refrigerant. The second expansion valve 32 is provided on the refrigerant line 11 between the internal condenser 12a and the heat-exchanger 13.

In the present embodiment, a first end of the first line 33 is connected to the second expansion valve 32. A second end of the first line 33 may be connected to the gas-liquid separator 31.

The first line 33 may selectively supply the refrigerant supplied from the internal condenser 12a to the gas-liquid separator 31 according to an operation of the second expansion valve 32.

A first end of the second line 34 may be connected to the refrigerant line 11 between the second expansion valve 32 and the heat-exchanger 13. A second end of the second line 34 may be connected to the refrigerant line 11 between the heat-exchanger 13 and the first expansion valve 14. The third expansion valve 35 may be provided on the second line 34.

In the present embodiment, first end of the third line 36 is connected to the third expansion valve 35. A second end of the third line 36 may be connected to the gas-liquid separator 31.

Here, the third expansion valve 35 may selectively expand the refrigerant supplied from the gas-liquid separator 31 through the third line 36 and supply the expanded refrigerant the heat-exchanger 13.

On the other hand, the third expansion valve 35 may supply the refrigerant supplied from the gas-liquid separator 31 through the third line 36 to the chiller 20 or the evaporator 15, in an unexpanded state.

The fourth expansion valve 37 may be provided on the refrigerant line 11 between the heat-exchanger 13 and the first expansion valve 14. In more detail, the fourth expansion valve 37 may be disposed between the heat-exchanger 13 and the second end of the second line 34.

In the present embodiment, first end of the fourth line 38 may be connected to the fourth expansion valve 37. A second end of the fourth line 38 may be connected to the first line 33 between the gas-liquid separator 31 and the second expansion valve 32.

In addition, the first supply line 37 connects the gas-liquid separator 31 to the compressor 10. When the refrigerant is supplied to the gas-liquid separator 31, the first supply line 37 may selectively supply the gaseous refrigerant from the gas-liquid separator 31 to the compressor 10.

That is, the first supply line 37 may connect the gas-liquid separator 31 to the compressor 10 such that the gaseous refrigerant separated by the gas-liquid separator 31 may selectively flow into the compressor 10.

Here, the first, second and third expansion valves 33, 34, and 35 may be selectively operated in the air conditioning mode of the vehicle including the cooling mode, the heating mode, and the dehumidification mode, and may selectively expand the refrigerant while controlling flowing of the refrigerant supplied to the gas injection device 30.

That is, each of the first expansion valve 33, the second expansion valve 34, and the third expansion valve 35 may be a 3-way electronic expansion valve having one inlet and two outlets and configured to selectively expand the refrigerant while controlling flowing of the refrigerant.

The gas-liquid separator 31 in the gas injection device 30 may be operated when the first expansion valve 33 expands the refrigerant in the air conditioning mode of the vehicle.

That is, when the first expansion valve 33 expands the refrigerant and supplies the expanded refrigerant to the gas-liquid separator 31, the gas-liquid separator 31 may supply the gaseous refrigerant, among the supplied refrigerant, to the compressor 12 through the supply line 37, to increase the flow rate of the refrigerant circulating through the refrigerant line 11.

Meanwhile, in the present embodiment, the heat pump system may further include a fifth expansion valve 40 and the second refrigerant connection line 41. First, the fifth expansion valve 40 may be provided at an upstream side of the chiller 20 on the first refrigerant connection line 21. The fifth expansion valve 40 may be a 3-way electronic expansion valve having one inlet and two outlets and configured to selectively expand the refrigerant while controlling flowing of the refrigerant.

Here, when the electrical component 102 or the battery module 104 is to be cooled by using the coolant having heat-exchanged with the refrigerant in the cooling mode of the vehicle, the fifth expansion valve 40 may expand the refrigerant introduced through the first refrigerant connection line 21 and flow the expanded refrigerant to the chiller 20.

That is, when the electrical component 102 or the battery module 104 is to be cooled in the refrigerant mode of the vehicle, the fifth expansion valve 40 may further lower the temperature of the coolant passing through the chiller 20, by expanding the refrigerant introduced through the first refrigerant connection line 21 to lower its temperature and by flowing the expanded refrigerant of the lowered temperature to the chiller 20.

Accordingly, the coolant cooled while passing through the chiller 30 may flow through the electrical component 102 or the battery module 104, thereby achieving more efficiently cooling.

To the contrary, when waste heat generated from the electrical component 102 or the battery module 104 is to be recollected in the heating mode of the vehicle, the fifth expansion valve 40 may flow the refrigerant introduced through the first refrigerant connection line 21, in an unexpanded state.

That is, in the heating mode of the vehicle, the heat-exchanger 13 evaporates the refrigerant through heat-exchange with the ambient air. Then, the evaporated refrigerant may flow into the fifth expansion valve 40 through the first refrigerant connection line 21. Therefore, the fifth expansion valve 40 may supply the refrigerant to the chiller 20, in an unexpanded state.

At this time, the chiller 20 may recollect the waste heat of the electrical component 102 or the battery module 104, while heat-exchanging the refrigerant supplied from the heat-exchanger 13 with the coolant supplied from the electrical component 102 or the battery module 104.

In addition, a first end of the second refrigerant connection line 41 may be connected to the fifth expansion valve 40. A second end of the second refrigerant connection line 41 may be connected to the refrigerant line 11 between the evaporator 15 and the compressor 10.

When only an ambient air heat is to be recollected in the heating mode of the vehicle interior, the second refrigerant connection line 41 may be selectively opened by an operation of the fifth expansion valve 40. That is, when only the ambient air heat is to be recollected, the second refrigerant connection line 41 is opened by the operation of the fifth expansion valve 40.

In such a state, the refrigerant passing through the heat-exchanger 13 is evaporated through heat-exchange with the ambient air, and at this time, the refrigerant may absorb the ambient air heat.

The refrigerant having recollected the ambient air heat may pass through the accumulator 16 along the opened second refrigerant connection line 41 and then be supplied to the compressor 10.

An operation and action of a heat pump system according to an embodiment will be described in detail with reference to FIG. 2 to FIG. 7.

First, the operation of a heat pump system for a vehicle according to an embodiment in the case that the gas-liquid separator 31 is operated and the battery module 104 is to be cooled in the cooling mode of the vehicle is described with reference to FIG. 2.

Figure 2:
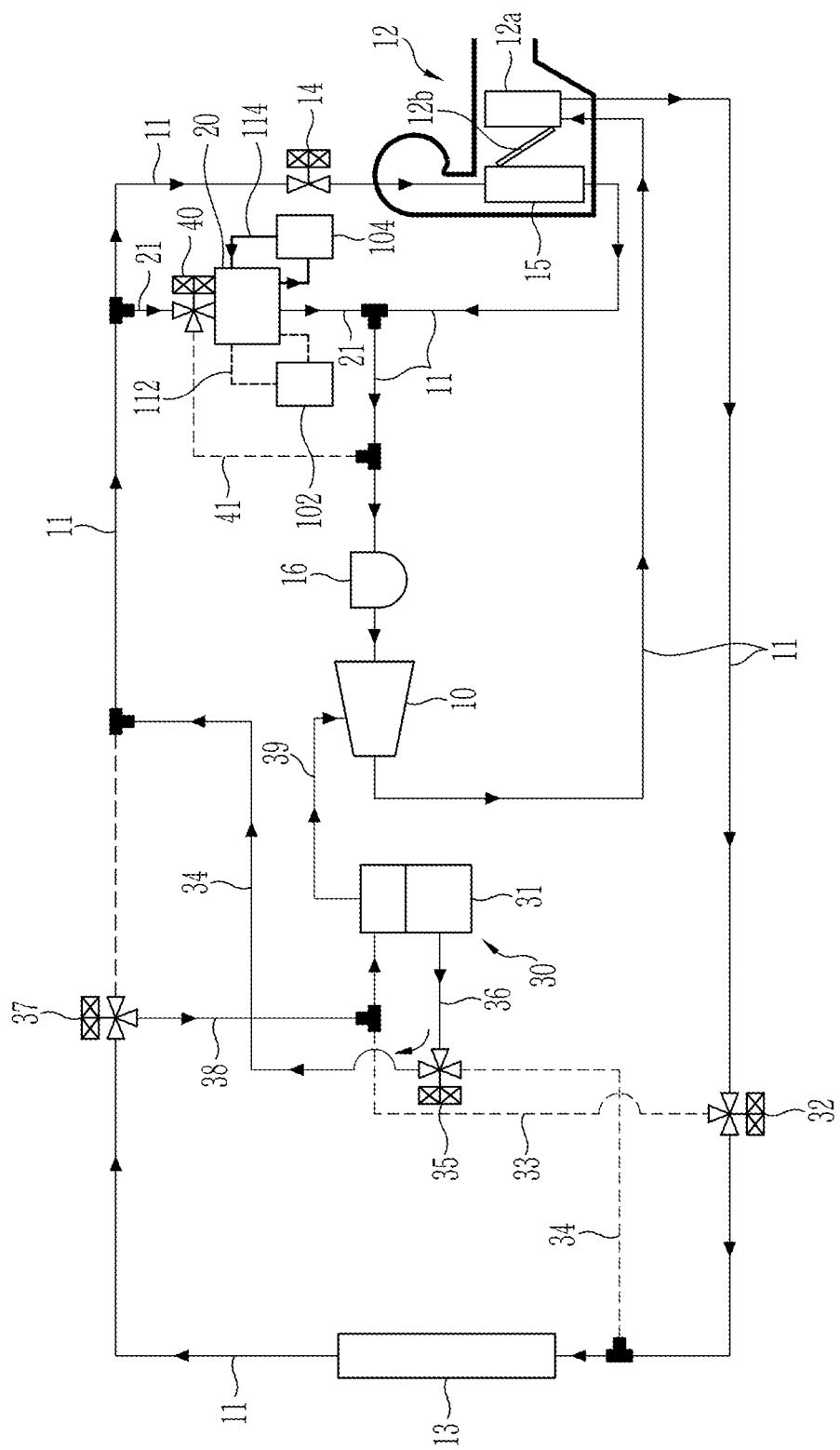
FIG. 2 is an operation diagram of a heat pump system for a vehicle according to an embodiment in the case that a gas-liquid separator is operated in a cooling mode of the vehicle, and a battery module is to be cooled.

FIG. 2 is an operation diagram of a heat pump system for a vehicle according to an embodiment in the case that a gas-liquid separator is operated in a cooling mode of the vehicle, and a battery module is to be cooled.

Referring to FIG. 2, the second refrigerant connection line 23 may be closed by an operation of the first expansion valve 33. Here, the second expansion valve 32 may supply the refrigerant introduced through the refrigerant line 11 to the heat-exchanger 13, without expansion. In addition, the second line 34 connected to the refrigerant line 11 at an upstream side of the heat-exchanger 13 with reference to the third expansion valve 35 is closed by an operation of the third expansion valve 35.

In addition, the second line 34 connected to the refrigerant line 11 at a downstream side of the heat-exchanger 13 with reference to the third expansion valve 35 is opened by the operation of the third expansion valve 35. Here, the upstream side of the heat-exchanger 13 and the downstream side of the heat-exchanger 13 may be set with reference to a flow direction of the refrigerant.

That is, with reference to a direction in which the refrigerant flows along the refrigerant line 11, a side through which the refrigerant flows into the heat-exchanger 13 may be defined as the upstream side of the heat-exchanger 13, and a side through which the refrigerant is discharged from the heat-exchanger 13 may be defined as the downstream side of the heat-exchanger 13.

The third line 36 is opened by the operation of the third expansion valve 35. The fourth line 38 may be opened by an operation of the fourth expansion valve 37. In addition, the supply line 39 may be opened.

At this time, a part of the refrigerant line 11 connecting the fourth expansion valve 37 and the opened second end of the second line 34 may be closed. Here, the third expansion valve 35 may flow the refrigerant supplied from the gas-liquid separator 31 through the third line 36 to the opened part of the second line 34, without expansion. That is, the liquid refrigerant stored in the gas-liquid separator 31 may flow sequentially through the third line 36 opened through the operation of the third expansion valve 35 and the second line 34.

The fourth expansion valve 37 may expand the refrigerant supplied from the heat-exchanger 13 and supply the expanded refrigerant to the gas-liquid separator 31 through the fourth line 38 and a part of the first line 33. Accordingly, the gas-liquid separator 31 may supply the gaseous refrigerant, among the introduced refrigerant, to the compressor 10 through the opened first supply line 37. That is, the gas injection device 30 may increase the flow rate of the refrigerant circulating through the refrigerant line 11, by returning the gaseous refrigerant separated while passing through the gas-liquid separator 31 back to the compressor 10 through the first supply line 37.

Meanwhile, the first refrigerant connection line 21 is opened by the operation of the fifth expansion valve 40. At the same time, the second refrigerant connection line 41 may be closed by the operation of the fifth expansion valve 40. Here, the fifth expansion valve 40 is configured to expand the refrigerant introduced from the gas-liquid separator 31 through the first refrigerant connection line 21 along the opened second line 34, the third line 36, and the refrigerant line 11. Then, the fifth expansion valve 40 may supply the expanded refrigerant to the chiller 20 through the first refrigerant connection line 21.

The refrigerant introduced to the chiller 20 may cool the coolant while being heat-exchanged with the coolant supplied from the battery module 104 through the second coolant line 114.

The coolant cooled at the chiller 20 is supplied to the battery module 104 along the second coolant line 114. Accordingly, the battery module 106 may be efficiently cooled by the coolant cooled at the chiller 20.

That is, the coolant circulating through the second coolant line 114 may efficiently cool the battery module 104 while repeatedly performing the above-described operation.

Meanwhile, the refrigerant introduced from the gas-liquid separator 31 along the opened second line 34, the third line 36, and the refrigerant line 11 flows to the first expansion valve 14. The first expansion valve 14 may expand the refrigerant introduced through the refrigerant line 11 and supply the expanded refrigerant to the evaporator 13.

Here, the ambient air introduced into the HVAC module 12 is cooled by the refrigerant in the low temperature state introduced into the evaporator 13 while passing through the evaporator 13.

At this time, the opening/closing door 12b closes a portion passing through to the internal condenser 12a such that the cooled ambient air may not pass through the internal condenser 12a. Therefore, the cooled ambient air may cool the vehicle interior, by being directly drawn to the vehicle interior.

Meanwhile, the refrigerants having passed through the evaporator 14 and the chiller 20, respectively, flow to the accumulator 16. Thereafter, the refrigerant may flow into the compressor 10 after passing through the accumulator 16.

That is, the refrigerant having passed through the accumulator 16 and the refrigerant supplied from the gas-liquid separator 31 through the first supply line 37 may be introduced into the compressor 10. The introduced refrigerant may be compressed by an operation of the compressor 10. The refrigerant compressed at the compressor 10 passes through the internal condenser 12a, and then supplied to the second expansion valve 32 along the refrigerant line 11. Then, the heat pump system may repeatedly perform above-described processes.

The heat pump system according to an embodiment increase the flow rate of the refrigerant flowing along the refrigerant line 11, while repeatedly performing the above-described operation.

In addition, the heat pump system may improve overall cooling performance and efficiency and efficiently cool the vehicle interior, by increasing the flow rate of the refrigerant flowing along the refrigerant line 11.

Simultaneously, the heat pump system may efficiently cool the battery module 104 by using the low temperature coolant cooled at the chiller 20.

An operation of a heat pump system for a vehicle according to an embodiment in the case that the gas-liquid separator 31 is not operated in the cooling mode of the vehicle is described below with reference to FIG. 4.

Figure 3:
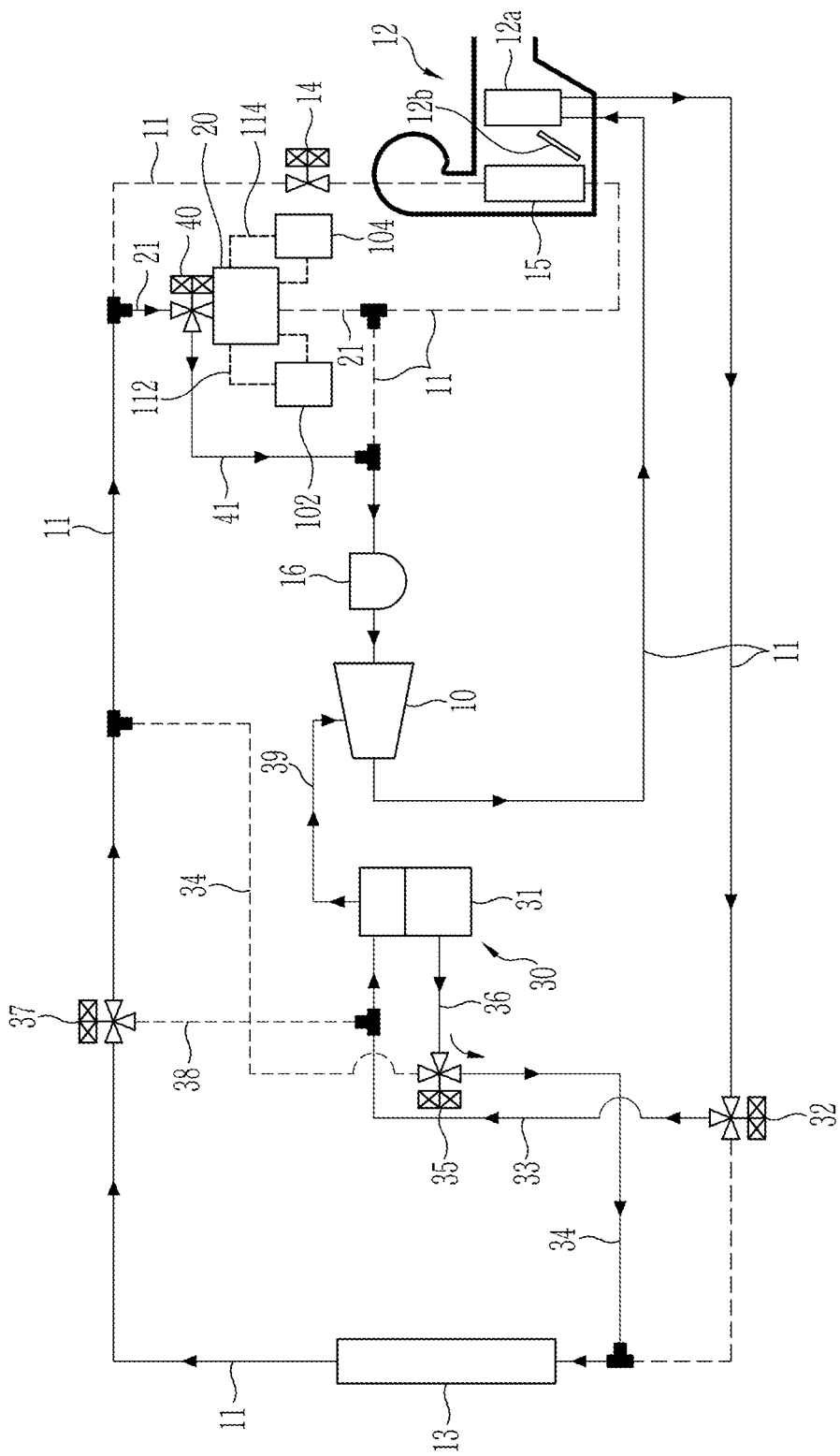
FIG. 3 is an operation diagram of a heat pump system for a vehicle according to an embodiment in the case that a gas-liquid separator is operated in a heating mode of the vehicle, and ambient air heat is to be recollected.

FIG. 3 is an operation diagram of a heat pump system for a vehicle according to an embodiment in the case that a gas-liquid separator is operated in a heating mode of the vehicle, and heat are not to be recollected.

Referring to FIG. 3, the heat pump system may absorb the ambient air heat from the ambient air while the gas-liquid separator 31 is operating. That is, when the gas injection device 30 is operated in the heating mode of the vehicle, the first expansion valve 14 stops operating. Accordingly, the supply of the refrigerant to the evaporator 15 may be stopped.

In the present embodiment, the first line 33 is opened by the operation of the second expansion valve 32. Here, the second expansion valve 32 may expand the refrigerant introduced through the refrigerant line 11 and supply the expanded refrigerant to the gas-liquid separator 31. In addition, the second line 34 connected to the refrigerant line 11 at the upstream side of the heat-exchanger 13 with reference to the third expansion valve 35 is opened by the operation of the third expansion valve 35.

In addition, the second line 34 connected to the refrigerant line 11 at the downstream side of the heat-exchanger 13 with reference to the third expansion valve 35 is closed by the operation of the third expansion valve 35.

The third line 36 is opened by the operation of the third expansion valve 35. The fourth line 38 may be closed by the operation of the fourth expansion valve 37. In addition, the supply line 39 is opened.

Accordingly, the gas-liquid separator 31 may supply the gaseous refrigerant, among the introduced refrigerant, to the compressor 10 through the opened first supply line 37. That is, the gas injection device 30 may increase the flow rate of the refrigerant circulating through the refrigerant line 11, by returning the gaseous refrigerant separated while passing through the gas-liquid separator 31 back to the compressor 10 through the first supply line 37.

Meanwhile, the third expansion valve 35 is configured to expand the refrigerant supplied from the gas-liquid separator 31 through the third line 36. The refrigerant expanded by the operation of the third expansion valve 35 may be supplied to the heat-exchanger 13 along the opened second line 34 and the refrigerant line 11.

That is, the liquid refrigerant stored in the gas-liquid separator 31 may flow to the heat-exchanger 13 along the third line 36 opened through the operation of the third expansion valve 35 and the second line 34 connected to the heat-exchanger 13.

The fourth expansion valve 37 may flow the refrigerant supplied from the heat-exchanger 13 to the refrigerant line 11 without expansion.

Meanwhile, a part of the first refrigerant connection line 21 connected to the fifth expansion valve 40 in the upstream side of the chiller 20 is opened by the operation of the fifth expansion valve 40.

Simultaneously, remaining part of the first refrigerant connection line 21 connected to the refrigerant line 11 at a downstream side of the chiller 20 may be closed by the operation of the fifth expansion valve 40. Here, the upstream side of the chiller 20 and the downstream side of the chiller 20 may be set with reference to a flow direction of the refrigerant.

That is, with reference to a direction in which the refrigerant flows along the first refrigerant connection line 21, a side through which the refrigerant flows into the chiller 20 may be defined as the upstream side of the chiller 20, and a side through which the refrigerant is discharged from the chiller 20 may be defined as the downstream side of the chiller 20.

In addition, the second refrigerant connection line 41 may be opened by the operation of the fifth expansion valve 40. In such a state, the fifth expansion valve 40 may flow the refrigerant introduced from the fourth expansion valve 37 through the first refrigerant connection refrigerant line 11 and a part of the line 21 to the second refrigerant connection line 41, without expansion. Accordingly, the refrigerant discharged from the fifth expansion valve 40 may be supplied to the compressor 10 along the second refrigerant connection line 41.

That is, the heat-exchanger 13 may evaporate the refrigerant supplied from the third expansion valve 35 along the second line 34 and the refrigerant line 11 by heat-exchanging with the ambient air. At this time, the refrigerant may directly absorb the ambient air heat from ambient air.

The refrigerant having recollected the ambient air heat may pass through the accumulator 16 along the second refrigerant connection line 41 opened by the operation of the fifth expansion valve 40, and then be supplied to the compressor 10.

That is, the refrigerant having passed through the accumulator 16 and the refrigerant supplied from the gas-liquid separator 31 through the first supply line 37 may be introduced into the compressor 10. The introduced refrigerant may be compressed by an operation of the compressor 10.

The refrigerant compressed at the compressor 10 is supplied to the internal condenser 12a along the refrigerant line 11. Here, the refrigerant supplied to the internal condenser 12a may increase the temperature of the ambient air drawn to the HVAC module 12.

The opening/closing door 12b is opened such that the ambient air drawn into the HVAC module 12 and having passed through the evaporator 15 may pass through the internal condenser 12a.

Accordingly, when passing through the evaporator 15 that is not supplied with the refrigerant, the ambient air drawn from the outside flows at the room temperature state without being cooled. That is, the drawn ambient air is converted to high temperature state while passing through the heater core 103 and then introduced to the vehicle interior, thereby realizing heating of the vehicle interior.

As such, a heat pump system according to an embodiment may recollect the ambient air heat at the heat-exchanger 13 while the vehicle is running, together with an operation of the gas injection device 30, thereby improving overall heating performance and efficiency.

In addition, the present disclosure may enhance the heating efficiency and performance, while minimizing the use of a separate electric heater.

In addition, heating performance may be maximized by increasing the flow rate of the refrigerant circulating through the refrigerant line 11 by the gas injection device 30.

An operation of a heat pump system for a vehicle according to an embodiment in the case that the gas-liquid separator 31 is operated in the heating mode of the vehicle and the ambient air heat, the waste heat of the electrical component 102, and the waste heat of the battery module 104 are to be recollected is described with reference to FIG. 4.

Figure 4:
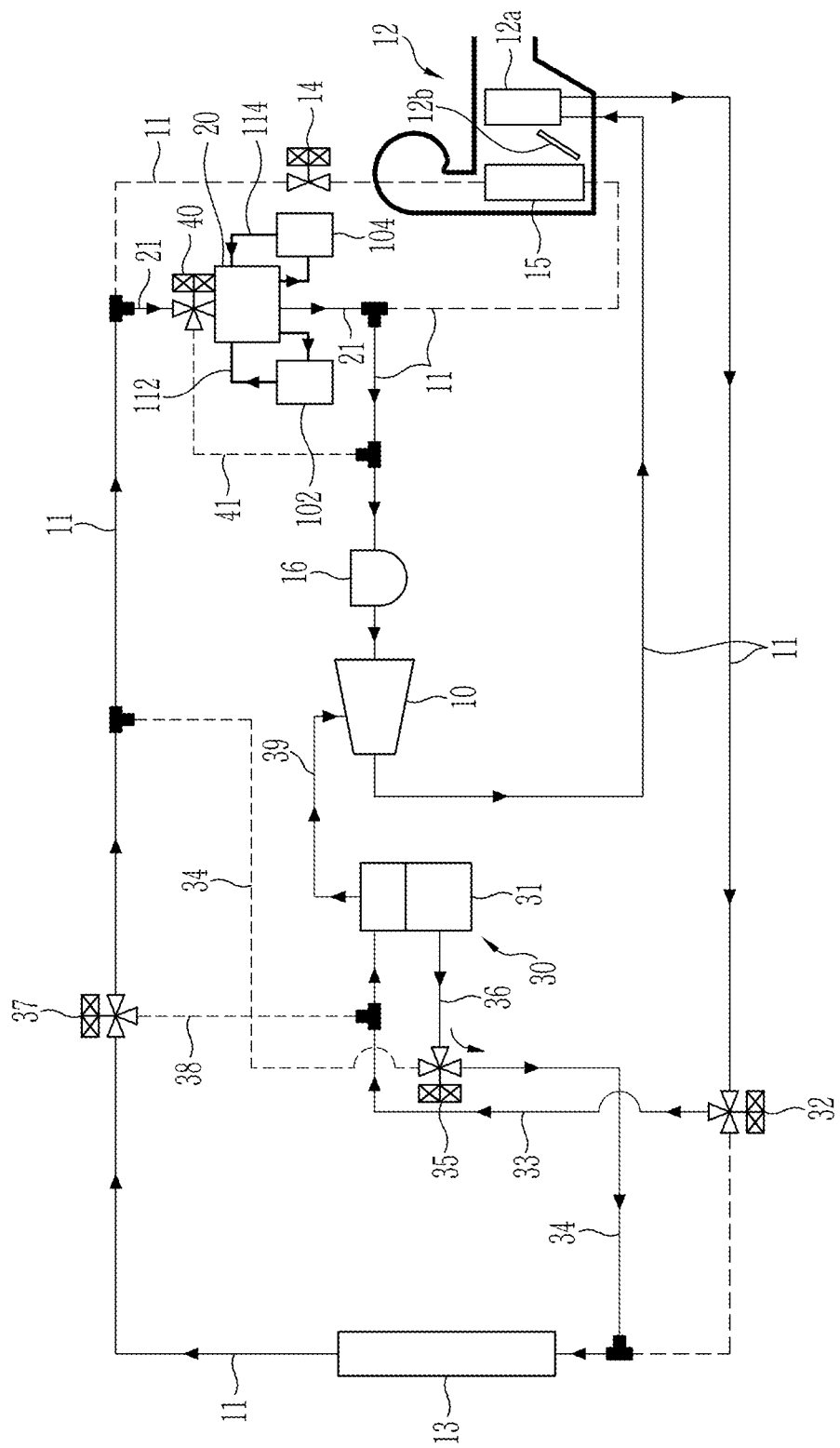
FIG. 4 is an operation diagram of a heat pump system for a vehicle according to an embodiment in the case that a gas-liquid separator is operated in a heating mode of the vehicle, and ambient air heat, waste heat of an electrical component, and waste heat of a battery module are to be recollected.

FIG. 4 is an operation diagram of a heat pump system for a vehicle according to an embodiment in the case that a gas-liquid separator is operated in a heating mode of the vehicle, and the ambient air heat, waste heat of an electrical component, and waste heat of a battery module are to be recollected.

Referring to FIG. 4, the heat pump system may and absorb the ambient air heat from the ambient air as well as the waste heat of the electrical component 102 and the waste heat of the battery module 104, in a state that the gas-liquid separator 31 is operated.

That is, when the gas injection device 30 is operated in the heating mode of the vehicle, the first expansion valve 14 stops operating. Accordingly, the supply of the refrigerant to the evaporator 15 may be stopped.

In the present embodiment, the first line 33 is opened by the operation of the second expansion valve 32. Here, the second expansion valve 32 may expand the refrigerant introduced through the refrigerant line 11 and supply the expanded refrigerant to the gas-liquid separator 31.

In addition, the second line 34 connected to the refrigerant line 11 at the upstream side of the heat-exchanger 13 with reference to the third expansion valve 35 is opened by the operation of the third expansion valve 35.

In addition, the second line 34 connected to the refrigerant line 11 at the downstream side of the heat-exchanger 13 with reference to the third expansion valve 35 is closed by the operation of the third expansion valve 35.

The third line 36 is opened by the operation of the third expansion valve 35. The fourth line 38 may be closed by the operation of the fourth expansion valve 37. In addition, the supply line 39 is opened. Accordingly, the gas-liquid separator 31 may supply the gaseous refrigerant, among the introduced refrigerant, to the compressor 10 through the opened first supply line 37.

That is, the gas injection device 30 may increase the flow rate of the refrigerant circulating through the refrigerant line 11, by returning the gaseous refrigerant separated while passing through the gas-liquid separator 31 back to the compressor 10 through the first supply line 37.

Meanwhile, the third expansion valve 35 is configured to expand the refrigerant supplied from the gas-liquid separator 31 through the third line 36. The refrigerant expanded by the operation of the third expansion valve 35 may be supplied to the heat-exchanger 13 along the opened second line 34 and the refrigerant line 11.

That is, the liquid refrigerant stored in the gas-liquid separator 31 may flow to the heat-exchanger 13 along the third line 36 opened through the operation of the third expansion valve 35 and the second line 34 connected to the heat-exchanger 13.

The fourth expansion valve 37 may flow the refrigerant supplied from the heat-exchanger 13 to the refrigerant line 11 without expansion. Here, the heat-exchanger 13 may evaporate the refrigerant supplied from the third expansion valve 35 along the second line 34 and the refrigerant line 11 by heat-exchanging with the ambient air. At this time, the refrigerant may directly absorb the ambient air heat from ambient air.

Meanwhile, the first connection line 21 is opened by the operation of the fifth expansion valve 40. At the same time, the second refrigerant connection line 41 is closed by the operation of the fifth expansion valve 40.

Here, the fifth expansion valve 40 may supply the refrigerant introduced from the fourth expansion valve 37 through the refrigerant line 11 to the chiller 20 without expansion.

The refrigerant introduced to the chiller 20 may cool the coolant while being heat-exchanged with the coolant supplied from the electrical component 102 through the first coolant line 112 and the coolant supplied from the battery module 104 through the second coolant line 114.

At this time, the coolant may be heated by recollecting waste heat from the electrical component 102 and the battery module 104 while cooling the electrical component 102 and the battery module 104. The coolant heated through such an operation may be supplied to the chiller 20.

Here, the chiller 20 may recollect the waste heat of the electrical component 102 and the battery module 104, while heat-exchanging the refrigerant with the coolant supplied from the electrical component 102 and the battery module 104 through the first coolant line 112 and the second coolant line 114.

The refrigerant having recollected the ambient air heat at the heat-exchanger 13 and having recollected the waste heat of the electrical component 102 and the battery module 104 at the chiller 20 may pass through the accumulator 16 along the refrigerant line 11 connected to the first refrigerant connection line 21, and then be supplied to the compressor 10.

That is, the refrigerant having passed through the accumulator 16 and the refrigerant supplied from the gas-liquid separator 31 through the first supply line 37 may be introduced into the compressor 10. The introduced refrigerant may be compressed by an operation of the compressor 10.

The refrigerant compressed at the compressor 10 is supplied to the internal condenser 12a along the refrigerant line 11. Here, the refrigerant supplied to the internal condenser 12a may increase the temperature of the ambient air drawn to the HVAC module 12.

The opening/closing door 12b is opened such that the ambient air drawn into the HVAC module 12 and having passed through the evaporator 15 may pass through the internal condenser 12a.

Accordingly, when passing through the evaporator 15 that is not supplied with the refrigerant, the ambient air drawn from the outside flows at the room temperature state without being cooled. That is, the drawn ambient air is converted to high temperature state while passing through the heater core 103 and then introduced to the vehicle interior, thereby realizing heating of the vehicle interior.

In addition, the refrigerant condensed at the internal condenser 12a may be supplied to the gas-liquid separator 31 by the operation of the second expansion valve 32.

As such, a heat pump system according to an embodiment may recollect the ambient air heat at the heat-exchanger 13 while the vehicle is running, together with the operation of the gas injection device 30, and smoothly recollect waste heat from the coolant heated while passing through the electrical component 102 and the battery module 104 from the chiller 20, thereby improving overall heating performance and efficiency.

In addition, the present disclosure may enhance the heating efficiency and performance, while minimizing the use of a separate electric heater.

In addition, heating performance may be maximized by increasing the flow rate of the refrigerant circulating through the refrigerant line 11 by the gas injection device 30.

Meanwhile, it is described that the ambient air heat, and the waste heat of the electrical component 102 and the battery module 104 are recollected together in the present exemplary embodiment, but it is not limited thereto, and at least one of the ambient air heat and the waste heat of the electrical component 102, or the waste heat of the battery module 104 may be selectively recollected.

First, the operation of a heat pump system for a vehicle according to an embodiment in the case that the gas-liquid separator 31 is operated and the battery module 104 is to be cooled in the cooling mode of the vehicle is described with reference to FIG. 5.

Figure 5:
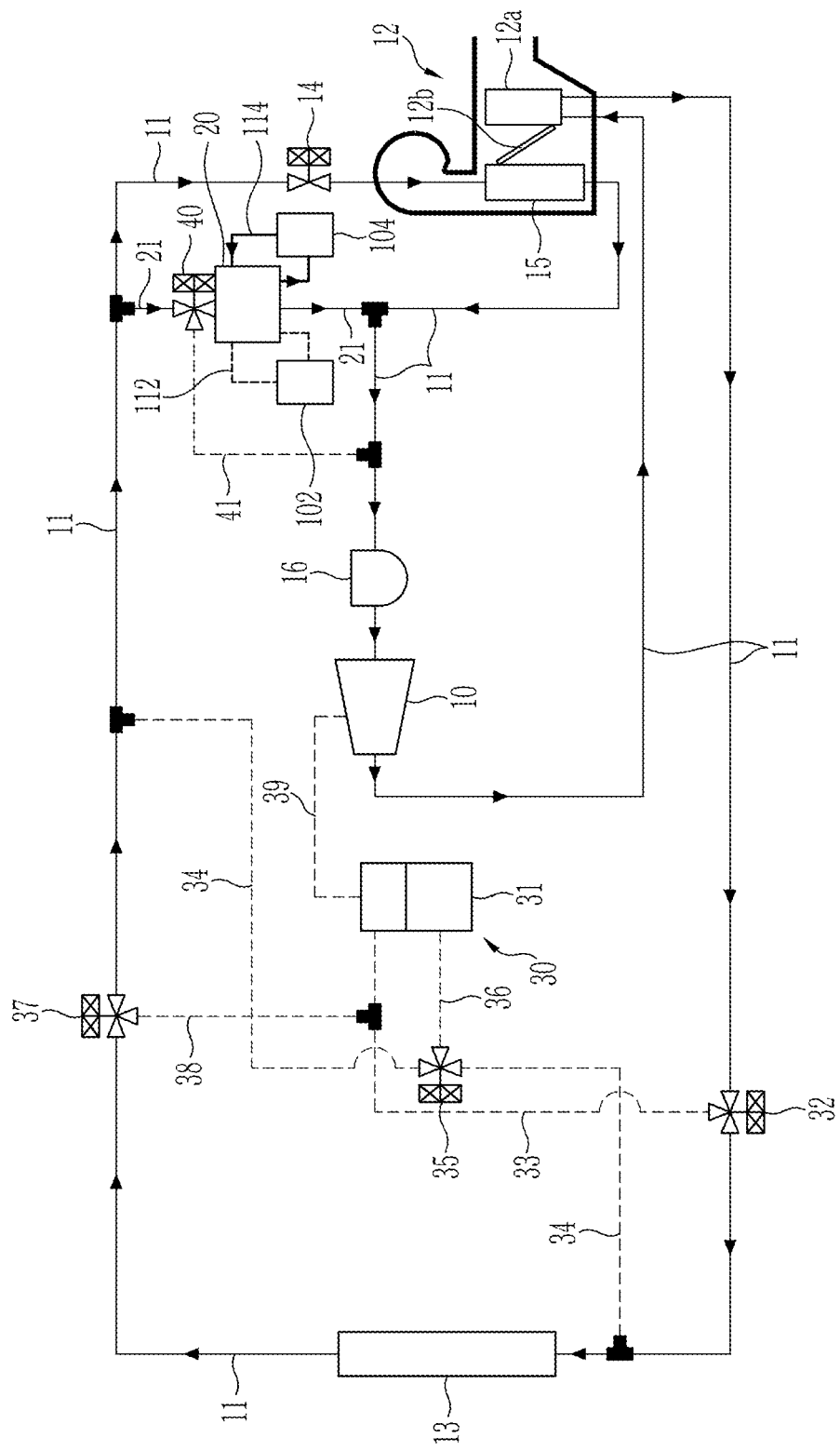
FIG. 5 is an operation diagram of a heat pump system for a vehicle according to an embodiment in the case that a gas-liquid separator is not operated in a cooling mode of the vehicle, and a battery module is to be cooled.

FIG. 5 is an operation diagram of a heat pump system for a vehicle according to an embodiment in the case that a gas-liquid separator is operated in a cooling mode of the vehicle, and a battery module is to be cooled.

Referring to FIG. 5, when the operation of the gas-liquid separator 31 is not required in the cooling mode of the vehicle, the first line 33 is closed by the operation of the second expansion valve 32.

Accordingly, flowing of the refrigerant to the gas-liquid separator 31 may be blocked. At the same time, the supply line 39 may be closed. In addition, the second line 34 and the third line 36 are closed by the operation of the third expansion valve 35. That is, the third expansion valve 35 may stop operating. In addition, the fourth line 38 may be closed by the operation of the fourth expansion valve 37. Here, the second expansion valve 32 and the fourth expansion valve 37 may flow the refrigerant supplied to the refrigerant line 11 without expansion. That is, the second expansion valve 32 may supply the refrigerant introduced from the internal condenser 12a along the refrigerant line 11 to the heat-exchanger 13 without expansion.

In addition, the fourth expansion valve 37 may supply the refrigerant introduced from the heat-exchanger 13 along the refrigerant line 11 to the first expansion valve 14 and the fifth expansion valve 40 without expansion.

Meanwhile, the first refrigerant connection line 21 is opened by the operation of the fifth expansion valve 40. At the same time, the second refrigerant connection line 41 is closed by the operation of the fifth expansion valve 40.

In such a state, the fifth expansion valve 40 expands the refrigerant introduced from the heat-exchanger 13 through the first refrigerant connection line 21 along the refrigerant line 11. Then, the fifth expansion valve 40 may supply the expanded refrigerant to the chiller 20 through the first refrigerant connection line 21.

The refrigerant introduced to the chiller 20 may cool the coolant while being heat-exchanged with the coolant supplied from the battery module 104 through the second coolant line 114.

The coolant cooled at the chiller 20 is supplied to the battery module 104 along the second coolant line 114. Accordingly, the battery module 106 may be efficiently cooled by the coolant cooled at the chiller 20.

That is, the coolant circulating through the second coolant line 114 may efficiently cool the battery module 104 while repeatedly performing the above-described operation.

Meanwhile, the first expansion valve 14 may expand the refrigerant supplied from the heat-exchanger 13 along the refrigerant line 11 and flow the expanded refrigerant to the refrigerant line 11. Accordingly, the refrigerant expanded at the first expansion valve 14 may flow to the evaporator 15 along the refrigerant line 11.

Here, the ambient air introduced into the HVAC module 12 is cooled by the refrigerant in the low temperature state introduced into the evaporator 13 while passing through the evaporator 13.

At this time, the opening/closing door 12b closes a portion passing through to the internal condenser 12a such that the cooled ambient air may not pass through the internal condenser 12a. Therefore, the cooled ambient air may cool the vehicle interior, by being directly drawn to the vehicle interior.

Meanwhile, the refrigerants having passed through the evaporator 14 and the chiller 20, respectively, flow to the accumulator 16. Thereafter, the refrigerant may flow into the compressor 10 after passing through the accumulator 16.

The refrigerant introduced into the compressor 10 may be compressed by the operation of the compressor 10. The refrigerant compressed at the compressor 10 passes through the internal condenser 12a, and then supplied to the second expansion valve 32 along the refrigerant line 11, which may be repeatedly perform.

That is, a heat pump system according to an embodiment may cool the vehicle interior while repeatedly perform the above-described processes, without an operation of the gas injection device 10.

Simultaneously, the heat pump system may efficiently cool the battery module 104 by using the low temperature coolant cooled at the chiller 20.

An operation of a heat pump system for a vehicle according to an embodiment in the case that the operation of the gas-liquid separator 31 is not required in the heating mode of the vehicle and the ambient air heat and the waste heat of the electrical component 107 are to be recollected is described with reference to FIG. 6.

Figure 6:
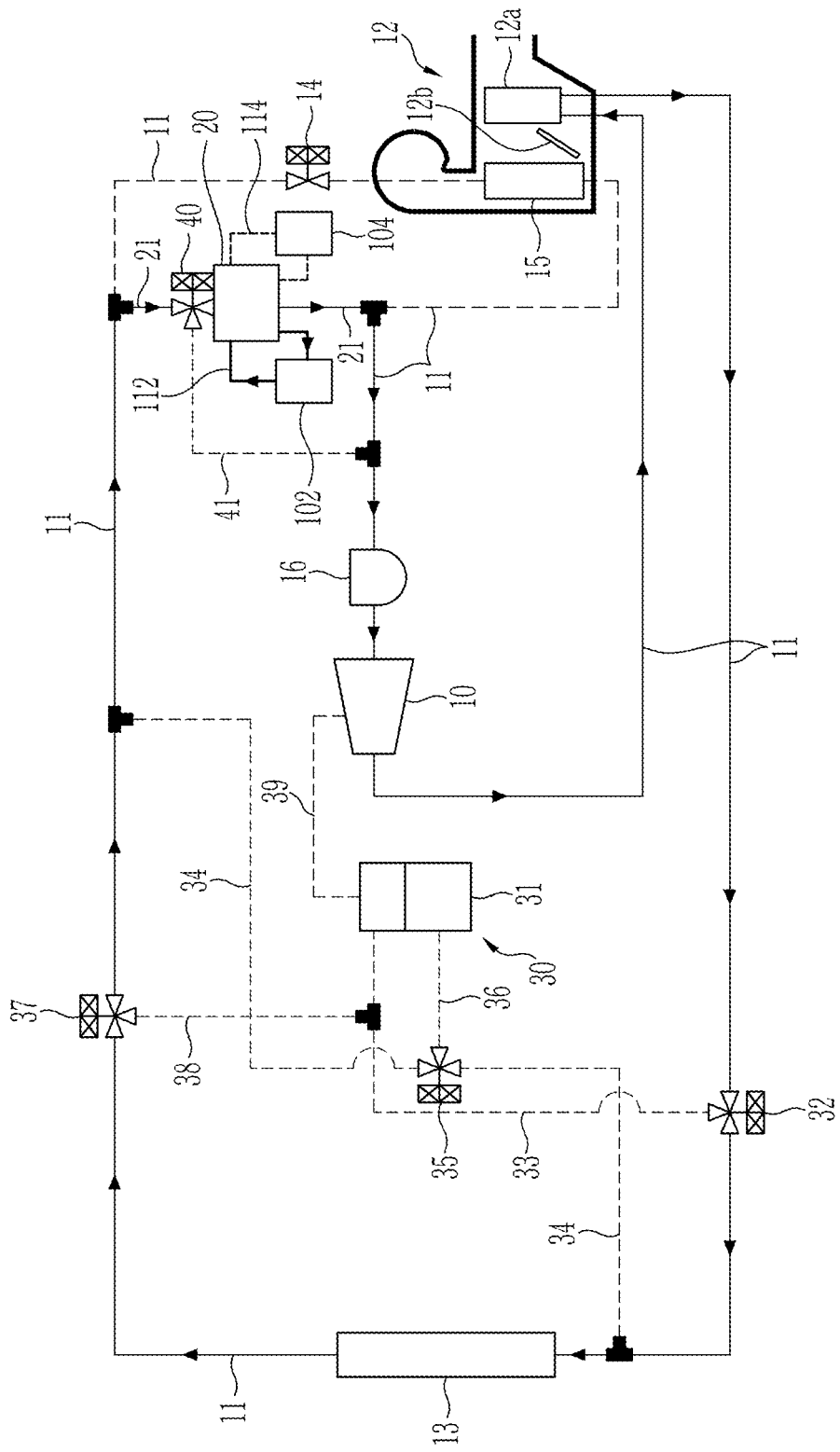
FIG. 6 is an operation diagram of a heat pump system for a vehicle according to an embodiment in the case that a gas-liquid separator is not operated in a heating mode of the vehicle, and ambient air heat and waste heat of an electrical component is to be recollected.

Referring to FIG. 6, the heat pump system may absorb the ambient air heat from the ambient air as well as the waste heat of the electrical component 102, in a state that the gas-liquid separator 31 is not operated.

That is, when the gas-liquid separator 31 is not operated in the heating mode of the vehicle, the first expansion valve 14 stops operating. Accordingly, the refrigerant may not be supplied to the evaporator 15. The first line 33 is closed by the operation of the second expansion valve 32. Here, the second expansion valve 32 may expand the refrigerant supplied from the internal condenser 12a and supply the expanded refrigerant to the heat-exchanger 13. In this case, the heat-exchanger 13 may evaporate the refrigerant supplied from the second expansion valve 32 through heat-exchange with the ambient air.

That is, the refrigerant passing through the heat-exchanger 13 may be evaporated through heat-exchange with the ambient air, and at this time, the refrigerant may absorb the ambient air heat.

In the present embodiment, the second line 34 and the third line 36 may be closed by the operation of the third expansion valve 35. That is, the third expansion valve 35 may stop operating.

In addition, the fourth line 38 is closed by the operation of the fourth expansion valve 37. At the same time, the supply line 39 may be closed.

Accordingly, flowing of the refrigerant to the gas-liquid separator 31 may be blocked. That is, the refrigerant discharged from the internal condenser 12a does not flow to the gas-liquid separator 31. Here, the fourth expansion valve 37 may flow the refrigerant supplied to the refrigerant line 11 without expansion.

Meanwhile, the first refrigerant connection line 21 is opened by the operation of the fifth expansion valve 40. At the same time, the second refrigerant connection line 41 may be closed by the operation of the fifth expansion valve 40.

In such a state, the fifth expansion valve 40 may flow the refrigerant introduced from the heat-exchanger 13 through the first refrigerant connection line 21 along the refrigerant line 11, without expansion. That is, the refrigerant evaporated at the heat-exchanger 13 is supplied to the chiller 20 along the first refrigerant connection line 21.

The refrigerant introduced to the chiller 20 may cool the coolant while being heat-exchanged with the coolant supplied from the electrical component 102 through the first coolant line 112.

At this time, the coolant may be heated by recollecting waste heat from the electrical component 102 while cooling the electrical component 102. The coolant heated through such an operation may be supplied to the chiller 20.

Here, the chiller 20 may recollect the waste heat of the electrical component 102, while heat-exchanging the coolant supplied from the electrical component 102 through the first coolant line 112 with the refrigerant.

Meanwhile, the refrigerant having passed through the chiller 20 is drawn into the accumulator 16. Thereafter, the refrigerant may flow into the compressor 10 after passing through the accumulator 16.

That is, the refrigerant having passed through the accumulator 16 may flow into the compressor 10. The introduced refrigerant may be compressed by an operation of the compressor 10.

The refrigerant compressed at the compressor 10 is supplied to the internal condenser 12a along the refrigerant line 11. Here, the refrigerant supplied to the internal condenser 12a may increase the temperature of the ambient air drawn to the HVAC module 12.

The opening/closing door 12b is opened such that the ambient air drawn into the HVAC module 12 and having passed through the evaporator 15 may pass through the internal condenser 12a.

Accordingly, when passing through the evaporator 15 that is not supplied with the refrigerant, the ambient air drawn from the outside flows at the room temperature state without being cooled. The drawn ambient air is converted to high temperature state while passing through the internal condenser 12a and then introduced to the vehicle interior, thereby realizing heating of the vehicle interior.

In addition, the refrigerant condensed at the internal condenser 12a may be supplied to the heat-exchanger 13 by the operation of the second expansion valve 32.

Accordingly, the refrigerant circulated the heat pump system may recollect the ambient air heat at the heat-exchanger 13, and smoothly recollect waste heat from the coolant heated while flowing from the chiller 20 to pass through the electrical component 102, thereby enhancing overall heating performance and efficiency.

In addition, the present disclosure may enhance the heating efficiency and performance, while minimizing the use of a separate electric heater.

Meanwhile, it is described that the ambient air heat and the waste heat of the electrical component 102 are recollected together in the present exemplary embodiment, but it is not limited thereto, and at least one of the ambient air heat, the waste heat of the electrical component 102, and the waste heat of the battery module 104 may be selectively recollected.

Therefore, as described above, according to a heat pump system for a vehicle according to an embodiment, the waste heat of the electrical component 102 and the battery module 104 may be recollected and the temperature of the battery module 104 may be adjusted, depending on the mode of the vehicle, by using the single chiller 20 where the coolant and the refrigerant are heat-exchanged.

In addition, according to the present disclosure, cooling and heating performance may be improved by applying the gas injection device 30 selectively operating in the air conditioning mode of the vehicle interior to increase the flow rate of the refrigerant.

In addition, according to the present disclosure, performance of the system may be maximized by using the gas injection device while minimizing the number of required components, and thus streamlining and simplification of the system may be achieved.

In addition, according to an embodiment, by efficiently adjusting the temperature of the battery module 104, the optimal performance of the battery module 104 may be enabled, and the overall travel distance of the vehicle may be increased due to the efficient management of the battery module 104.

In addition, according to the present disclosure, heating efficiency may be enhanced by selectively utilizing the ambient air heat, or the waste heat of the electrical component 102, or the waste heat of the battery module 104 in the heating mode of the vehicle.

In addition, according to an embodiment, it is possible to reduce manufacturing cost and weight through simplification of an entire system, and to improve space utilization.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A heat pump system for a vehicle, comprising:
a compressor configured to compress a refrigerant;
a HVAC module having an internal condenser and an evaporator connected to the compressor through a refrigerant line, further having an opening and closing door configured to adjust air that passes through the evaporator to flow into the internal condenser, according to a cooling mode or a heating mode of the vehicle;
a heat-exchanger connected to the internal condenser through the refrigerant line, the heat-exchanger being configured to heat-exchange the refrigerant supplied from the internal condenser with air to condensate or evaporate the refrigerant;
a first expansion valve positioned on the refrigerant line between the heat-exchanger and the evaporator;
a gas injection device connected to the refrigerant line between the internal condenser and the heat-exchanger, the gas injection device being configured to expand and flow the refrigerant supplied from the internal condenser or the heat-exchanger, and to supply a portion the supplied refrigerant to the compressor to increase a flow rate of the refrigerant circulating the refrigerant line;
a first refrigerant connection line having a first end connected to the refrigerant line between the compressor and the evaporator, and a second end connected to the refrigerant line between the heat-exchanger and the evaporator; and a chiller positioned on the first refrigerant connection line, the chiller being configured to adjust temperature of the coolant by heat-exchanging the refrigerant introduced through the first refrigerant connection line with a coolant;

wherein the gas injection device further comprises:
a gas-liquid separator configured to separate and discharge a gas refrigerant and a liquid refrigerant from an introduced refrigerant;
a second expansion valve positioned on the refrigerant line between the internal condenser and the heat-exchanger;
a first line having a first end connected to the second expansion valve and a second end connected to the gas-liquid separator, the first line being configured to supply the refrigerant supplied from the internal condenser to the gas-liquid separator according to an operation of the second expansion valve;
a second line having a first end connected to the refrigerant line between the second expansion valve and the heat-exchanger, and a second end connected to the refrigerant line between the heat-exchanger and the evaporator;
a third expansion valve positioned on the second line;
a third line having a first end connected to the third expansion valve, and a second end connected to the gas-liquid separator;
a fourth expansion valve positioned on the refrigerant line between the heat-exchanger and the first expansion valve;
a fourth line having a first end connected to the fourth expansion valve, and a second end connected to the first line between the gas-liquid separator and the second expansion valve; and
a supply line connecting the gas-liquid separator and the compressor, the supply line being configured to supply the gaseous refrigerant from the gas-liquid separator to the compressor.

2. The heat pump system of claim 1, wherein the third expansion valve is configured to:
expand the refrigerant supplied from the gas-liquid separator and supply the expanded refrigerant to the heat-exchanger; or
supply the refrigerant supplied from the gas-liquid separator to the chiller or the evaporator, in an unexpanded state.

3. The heat pump system of claim 1, wherein the second, the third, and the fourth expansion valves are operated in an air conditioning mode of the vehicle including the cooling mode, the heating mode, and a dehumidification mode, wherein the second, the third, and the fourth expansion valves are configured to expand the refrigerant while controlling flowing of the refrigerant supplied to the gas injection device.

4. The heat pump system of claim 1, wherein the gas-liquid separator is operated when the second expansion valve or the fourth expansion valve expands the refrigerant, and supplies the expanded refrigerant to the gas-liquid separator in an air conditioning mode of the vehicle, and wherein the gas-liquid separator is configured to supply the gas refrigerant among the supplied refrigerant to the compressor through the supply line to increase the flow rate of the refrigerant circulating the refrigerant line.

5. The heat pump system of claim 1, further comprising:
a fifth expansion valve positioned on the first refrigerant connection line; and
a second refrigerant connection line having a first end connected to the fifth expansion valve, and a second end connected to the refrigerant line between the evaporator and the compressor.

6. The heat pump system of claim 5, wherein when only an ambient air heat is to be recollected in the heating mode of the vehicle, the second refrigerant connection line is opened by the fifth expansion valve.

7. The heat pump system of claim 5, wherein:
when the gas-liquid separator is operated in a cooling mode of the vehicle and cooling of a battery module is required:
the first line is closed by the second expansion valve;
the second line connected to the refrigerant line at an upstream side of the heat-exchanger with reference to the third expansion valve is closed by the third expansion valve;
the second line connected to the refrigerant line at a downstream side of the heat-exchanger with reference to the third expansion valve is opened by the third expansion valve;
the third line is opened by the third expansion valve;
the fourth line is opened by the fourth expansion valve;
the supply line is opened;
the first refrigerant connection line is opened by the fifth expansion valve;
the second refrigerant connection line is closed by the fifth expansion valve;
the first expansion valve expands the refrigerant introduced through the refrigerant line and supplies the expanded refrigerant to the evaporator;
the second expansion valve supplies the refrigerant introduced through the refrigerant line to the heat-exchanger without expansion;
the third expansion valve flows the refrigerant supplied from the gas-liquid separator to a part of the second line without expansion;
the fourth expansion valve expands the refrigerant supplied from the heat-exchanger and supplies the expanded refrigerant to the gas-liquid separator;
the fifth expansion valve expands the refrigerant introduced from the gas-liquid separator through the second line and a part of the refrigerant line, and supplies the expanded refrigerant to the chiller through the first refrigerant connection line; and
the gas-liquid separator supplies the gaseous refrigerant, among the introduced refrigerant, to the compressor through the opened supply line.

8. The heat pump system of claim 5, wherein, when an operation of the gas-liquid separator is not required in a cooling mode of the vehicle, and cooling of a battery module is required:
the first line is closed by the second expansion valve;
the second line and the third line are closed by the third expansion valve;
the fourth line is closed by the fourth expansion valve;
the first refrigerant connection line is opened by the fifth expansion valve;
the second refrigerant connection line is closed by the fifth expansion valve;
flowing of the refrigerant to the gas-liquid separator is blocked;
the supply line is closed;

the first expansion valve expands the supplied refrigerant and supplies the expanded refrigerant the evaporator through the refrigerant line;
the second expansion valve and the fourth expansion valve flows the supplied refrigerant without expansion;
the third expansion valve stops operating; and
the fifth expansion valve expands the supplied refrigerant and supplies the expanded refrigerant the chiller through the first refrigerant connection line.

9. The heat pump system of claim 5, wherein, when the gas-liquid separator is operated in the heating mode of the vehicle, and waste heat of an ambient air heat and an electrical component is to be recollected:
the first expansion valve stops operating;
the first line is opened by the second expansion valve;
the second line connected to the refrigerant line at an upstream side of the heat-exchanger with reference to the third expansion valve is opened by the third expansion valve;
the second line connected to the refrigerant line at a downstream side of the heat-exchanger with reference to the third expansion valve is closed by the third expansion valve;
the third line is opened by the third expansion valve;
the fourth line is closed by the fourth expansion valve;
the supply line is opened;
the first refrigerant connection line is opened by the fifth expansion valve;
the second refrigerant connection line is closed by the fifth expansion valve;
the second expansion valve expands the refrigerant introduced through the refrigerant line and supplies the expanded refrigerant to the gas-liquid separator;
the third expansion valve expands the refrigerant supplied from the gas-liquid separator and supplies the expanded refrigerant to the heat-exchanger;
the fourth expansion valve flows the refrigerant supplied from the heat-exchanger to the refrigerant line without expansion;
the fifth expansion valve supplies the refrigerant introduced from the fourth expansion valve through the refrigerant line to the chiller without expansion; and
the gas-liquid separator supplies the gaseous refrigerant, among the introduced refrigerant, to the compressor through the opened supply line.

10. The heat pump system of claim 5, wherein, when the gas-liquid separator is operated in the heating mode of the vehicle, and an ambient air heat is to be recollected:
the first expansion valve stops operating;
the first line is opened by the second expansion valve;
the second line connected to the refrigerant line at an upstream side of the heat-exchanger with reference to the third expansion valve is opened by the third expansion valve;
the second line connected to the refrigerant line at a downstream side of the heat-exchanger with reference to the third expansion valve is closed by the third expansion valve;
the third line is opened by the third expansion valve;
the fourth line is closed by the fourth expansion valve;
the supply line is opened;
a part of the first refrigerant connection line connected to the fifth expansion valve at an upstream side of the chiller is opened by the fifth expansion valve;
remaining part of the first refrigerant connection line connected to the refrigerant line at a downstream side of the chiller is closed by the fifth expansion valve;
the second refrigerant connection line is opened by the fifth expansion valve;
the second expansion valve expands the refrigerant introduced through the refrigerant line and supplies the expanded refrigerant to the gas-liquid separator;
the third expansion valve expands the refrigerant supplied from the gas-liquid separator and supplies the expanded refrigerant to the heat-exchanger;
the fourth expansion valve flows the refrigerant supplied from the heat-exchanger to the refrigerant line without expansion;
the fifth expansion valve supplies the refrigerant introduced from the fourth expansion valve through the refrigerant line to the compressor through the second refrigerant connection line without expansion; and
the gas-liquid separator supplies the gaseous refrigerant, among the introduced refrigerant, to the compressor through the opened supply line.

11. The heat pump system of claim 5, wherein, when an operation of the gas-liquid separator is not required in the heating mode of the vehicle, and waste heat of an ambient air heat and an electrical component is to be recollected:
the first expansion valve stops operating;
the first line is closed by the second expansion valve;
the second line and the third line are closed by the third expansion valve;
the fourth line is closed by the fourth expansion valve;
the first refrigerant connection line is opened by the fifth expansion valve;
the second refrigerant connection line is closed by the fifth expansion valve;
flowing of the refrigerant to the gas-liquid separator is blocked;
the supply line is closed;
the second expansion valve expands the refrigerant supplied from the internal condenser and supplies the expanded refrigerant to the heat-exchanger;
the third expansion valve stops operating;
the fourth expansion valve flows the supplied refrigerant to the refrigerant line without expansion; and
the fifth expansion valve supplies the supplied refrigerant to the chiller through the first refrigerant connection line without expansion.

12. The heat pump system of claim 5, wherein the second expansion valve, the third expansion valve, the fourth expansion valve, and the fifth expansion valve are 3-way electronic expansion valves each having one inlet and two outlets, and are configured to expand the refrigerant while controlling flowing of the refrigerant.

13. The heat pump system of claim 5, wherein the fifth expansion valve is configured to:
flow the refrigerant introduced through the first refrigerant connection line in an expanded state in a cooling mode of the vehicle; and
flow the refrigerant introduced through the first refrigerant connection line in an unexpanded state, in the heating mode of the vehicle.

14. The heat pump system of claim 1, further comprising a cooling apparatus comprising an electrical component and a battery module through which the coolant circulates,
wherein the chiller is connected to the electrical component through a first coolant line through which the coolant circulates, and is connected to the battery module through a second coolant line through which the coolant circulates.

15. The heat pump system of claim 14, wherein, when waste heat of the electrical component is to be recollected in the heating mode of the vehicle, the first coolant line is opened to connect the chiller and the electrical component.

16. The heat pump system of claim 14, wherein, when the battery module is to be cooled in a cooling mode of the vehicle, or when waste heat of the battery module is to be recollected in the heating mode of the vehicle, the second coolant line is opened to connect the chiller and the battery module.

17. The heat pump system of claim 1, further comprising an accumulator positioned on the refrigerant line between the evaporator and the compressor.

* * * * *